(12) United States Patent
Sener

(10) Patent No.: US 9,915,153 B2
(45) Date of Patent: Mar. 13, 2018

(54) TURBINE SHROUD SEGMENT ASSEMBLY WITH EXPANSION JOINTS

(71) Applicant: GENERAL ELECTRIC COMPANY, Schenectady, NY (US)

(72) Inventor: Alexander Martin Sener, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 14/708,934

(22) Filed: May 11, 2015

(65) Prior Publication Data

US 2016/0333703 A1 Nov. 17, 2016

(51) Int. Cl.
*F01D 11/08* (2006.01)
*F01D 5/22* (2006.01)
*F01D 25/24* (2006.01)

(52) U.S. Cl.
CPC .......... *F01D 5/225* (2013.01); *F01D 25/246* (2013.01); *F05D 2230/642* (2013.01); *F05D 2240/11* (2013.01); *Y02T 50/672* (2013.01)

(58) Field of Classification Search
CPC ........ F01D 5/225; F01D 25/246; F01D 5/143; F01D 11/08; F01D 11/14; F01D 11/22; F05D 2230/642; F05D 2240/11
USPC ........................................................ 415/134
See application file for complete search history.

(56) References Cited

U.S. PATENT DOCUMENTS

| 2,651,492 A | 9/1953 | Feilden |
| 2,763,462 A | 9/1956 | McDowall et al. |
| 3,583,824 A * | 6/1971 | Smuland ................. F01D 11/18 415/117 |
| 3,947,145 A | 3/1976 | Michel et al. |

(Continued)

FOREIGN PATENT DOCUMENTS

| CN | 103291387 A | 9/2013 |
| CN | 204283516 U | 4/2015 |

(Continued)

OTHER PUBLICATIONS

Japanese Search Report issued in connection with corresponding JP Application No. 2016-094216 dated Apr. 12, 2017.

(Continued)

*Primary Examiner* — Aaron R Eastman
(74) *Attorney, Agent, or Firm* — General Electric Company; William Scott Andes

(57) ABSTRACT

A shroud segment assembly for use within a turbine shroud of a gas turbine engine may generally include a forward shroud portion having a forward outer arm and a forward inner arm extending from a forward wall and an aft shroud portion having an aft outer arm and an aft inner arm extending from an aft wall. Additionally, the shroud segment assembly may include a first expansion joint positioned between the forward and aft shroud portions such that the first expansion joint extends circumferentially between the forward outer arm of the forward shroud portion and the aft outer arm of the aft shroud portion and a second expansion joint positioned between the forward and aft shroud portions such that the second expansion joint extends circumferentially between the forward inner arm of the forward shroud portion and the aft outer arm of the aft shroud portion.

15 Claims, 10 Drawing Sheets

(56) References Cited

U.S. PATENT DOCUMENTS

| | | | |
|---|---|---|---|
| 5,871,333 A * | 2/1999 | Halsey | F01D 11/22 415/173.1 |
| 6,048,170 A * | 4/2000 | Dodd | F01D 11/005 415/135 |
| 6,412,149 B1 | 7/2002 | Overberg | |
| 2002/0127101 A1 * | 9/2002 | Bekrenev | F01D 9/042 415/232 |
| 2003/0031557 A1 * | 2/2003 | Arilla | F01D 25/246 415/173.1 |
| 2004/0219011 A1 * | 11/2004 | Albers | F01D 11/16 415/174.2 |
| 2005/0249584 A1 * | 11/2005 | Amiot | F01D 9/04 415/115 |
| 2007/0009349 A1 | 1/2007 | Ward et al. | |
| 2007/0031258 A1 * | 2/2007 | Campbell | F01D 9/04 416/189 |
| 2008/0206046 A1 * | 8/2008 | Razzell | F01D 11/005 415/173.1 |
| 2009/0155051 A1 * | 6/2009 | Lee | F01D 5/186 415/115 |
| 2009/0285675 A1 * | 11/2009 | Lewis | F01D 11/12 415/173.1 |
| 2012/0082540 A1 * | 4/2012 | Dziech | F01D 11/005 415/173.1 |
| 2012/0171027 A1 * | 7/2012 | Albers | F01D 11/005 415/208.1 |
| 2013/0022442 A1 * | 1/2013 | Nanukuttan | F01D 11/22 415/1 |
| 2013/0084160 A1 | 4/2013 | Fleming et al. | |
| 2013/0236298 A1 * | 9/2013 | Chouhan | F01D 11/02 415/173.5 |
| 2014/0023490 A1 * | 1/2014 | Hillier | F01D 11/005 415/173.6 |

FOREIGN PATENT DOCUMENTS

| | | |
|---|---|---|
| JP | S63-170506 A | 7/1988 |
| JP | S63-239301 A | 10/1988 |
| JP | 2001-073711 A | 3/2001 |
| WO | 2014/130762 A1 | 8/2014 |

OTHER PUBLICATIONS

Notification of Reasons for Refusal issued in connection with corresponding JP Application No. 2016-094216 dated Apr. 18, 2017.

First Office Action and Search issued in connection with corresponding CN Application No. 201610651639.5 dated May 12, 2017.

* cited by examiner

TURBINE SHROUD SEGMENT ASSEMBLY WITH EXPANSION JOINTS

FIELD OF THE INVENTION

The present subject matter relates generally to turbine shrouds and, more particularly, to a shroud segment assembly for a turbine shroud having one or more expansion joints associated therewith.

BACKGROUND OF THE INVENTION

A typical gas turbine engine includes one or more turbine rotors configured to extract energy from a flow of combustion gases directed through the engine. Each rotor includes an annular array of blades coupled to a rotor disk. The radially outermost boundary of the flowpath through the rotor is defined primarily by a turbine shroud, which is a stationary structure that circumscribes the tips of the blades. As is generally understood, the various rotor components operate in an extremely high temperature environment and it is often required that the components be cooled by an air flow to ensure adequate service life. Typically, the air used for cooling is extracted (or bled) from the compressor, which negatively impacts the specific fuel consumption ("SFC") of the gas turbine engine.

In the past, it has been proposed to replace metallic shroud structures with materials having improved high-temperature capabilities, such as ceramic matrix composite (CMC) materials. These materials have unique mechanical properties that must be considered during the design and application of a turbine component, such as a shroud segment. For example, when compared to metallic materials, CMC materials have relatively low tensile ductility or low strain to failure, and a low coefficient of thermal expansion ("CTE").

One type of segmented CMC shroud incorporates a rectangular "box" design. Box shroud segments typically include an outer wall, an inner wall and first and second sidewalls extending between the inner and outer walls to form a complete rectangular-shaped cross-section. The outer wall is disposed on the casing-side of the turbine shroud and forms the radially outermost portion of the shroud segment. The inner wall is disposed on the flowpath-side of the turbine shroud and forms the radially innermost portion of the shroud segment. As such, the inner wall defines the radial outer flowpath boundary for the combustion gases flowing through the rotor.

Given the direct exposure of the inner wall of the shroud segment to the hot gases flowing through the rotor as comparted to the shielded position of the outer wall of the shroud segment, a significant thermal gradient often exists between the inner wall and the outer wall. As a result, the inner and outer walls thermally expand and contract at differing rates. Such differing expansion/contraction rates cause thermally-induced strain within the shroud segment, which can significantly impact the component life of the segment. This is particularly true for gas turbine engines having turbine shrouds exposed to extremely high thermal gradient conditions.

Accordingly, an improved shroud segment assembly that incorporates expansion joints to allow one or more of the segment walls or sides to expand and/or contract independent from other segment walls/sides so as to provide a reduction in the resulting thermally-induced strain within the assembly would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a shroud segment assembly for use within a turbine shroud of a gas turbine engine. The shroud segment assembly may generally include a forward shroud portion extending circumferentially between a first forward end and a second forward end. The forward shroud portion may include a forward outer arm and a forward inner arm extending from a forward wall of the forward shroud portion. The shroud segment assembly may also include a separate aft shroud portion extending circumferentially between a first aft end and a second aft end. The aft shroud portion may include an aft outer arm and an aft inner arm extending from an aft wall of the aft shroud portion. Additionally, the shroud segment assembly may include a first expansion joint positioned between the forward and aft shroud portions such that the first expansion joint extends circumferentially between the forward outer arm of the forward shroud portion and the aft outer arm of the aft shroud portion and a second expansion joint positioned between the forward and aft shroud portions such that the second expansion joint extends circumferentially between the forward inner arm of the forward shroud portion and the aft inner arm of the aft shroud portion.

In another aspect, the present subject matter is directed to a shroud segment assembly for use within a turbine shroud of a gas turbine engine. The shroud segment assembly may generally include a shroud body extending circumferentially between a first end and a second end and radially between a radially inner side and a radially outer side. The shroud body may include an outer wall extending along the radially outer side of the shroud body and forward and aft walls extending radially inwardly from the outer wall. The shroud body may also include a forward arm extending from the forward wall in the direction of the aft wall along the radially inner side of the shroud body and an aft arm extending from the aft wall in the direction of the forward wall along the radially inner side of the shroud body. The forward wall may be spaced apart axially from the aft wall such that a circumferential slot is defined between the forward and aft arms that extends circumferentially between the first and second ends along the radially inner side of the shroud body. In addition, the shroud segment assembly may include an expansion joint positioned within the circumferential slot between the forward and aft arms.

In a further aspect, the present subject matter is directed to a shroud segment assembly for use within a turbine shroud of a gas turbine engine. The shroud segment assembly may generally include a shroud body extending circumferentially between a first end and a second end and radially between a radially inner side and a radially outer side. The shroud body may include an inner wall extending along the radially inner side of the shroud body and forward and aft walls extending radially outwardly from the outer wall. The shroud body may also include a forward arm extending from the forward wall in the direction of the aft wall along the radially outer side of the shroud body and an aft arm extending from the aft wall in the direction of the forward wall along the radially outer side of the shroud body. The forward wall may be spaced apart axially from the aft wall such that a circumferential slot is defined between the forward and aft arms that extends circumferentially between the first and second ends along the radially outer side of the shroud body. In addition, the shroud segment assembly may include an expansion joint positioned within the circumferential slot between the forward and aft arms. The expansion joint may include a radially outer wall, a radially inner wall and a connecting wall extending between the radially inner and outer walls. The expansion joint may define a forward recess between the radially inner and outer walls along a forward side of the connecting wall and an aft recess between the upper and lower walls along an aft side of the connecting wall, wherein the forward arm is configured to be received within the forward recess and the aft arm is configured to be received within the aft recess.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
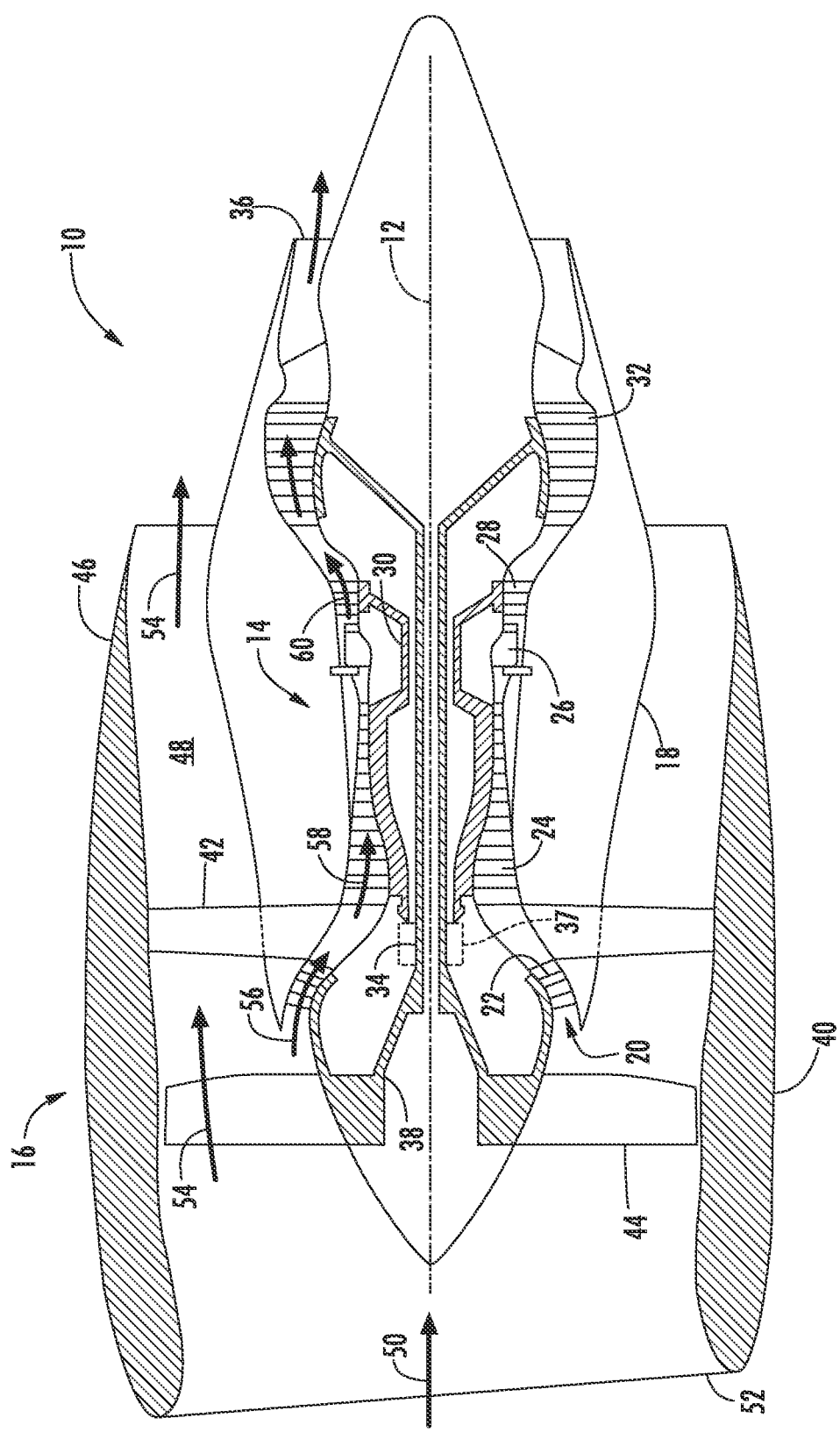
FIG. 1 illustrates a cross-sectional view of one embodiment of a gas turbine engine that may be utilized within an aircraft in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a shroud segment assembly for use within a turbine shroud of a gas turbine engine. Specifically, in several embodiments, the shroud segment assembly may include at least one expansion joint that allows one or more of the walls or sides of the shroud segment assembly to thermally expand and/or contract independently of the other wall/sides of the assembly. As such, the disclosed assembly may experience decreased thermally-induced strain during operating conditions that create a relatively high thermal gradient across the assembly.

For example, in several embodiments, the shroud segment assembly may include separate forward and aft shroud portions that, in combination, generally define the forward and aft halves, respectively, of a box-type shroud segment. In such embodiments, the shroud segment assembly may also include first and second expansion joints configured to be positioned between adjacent radially inner and outer arms of the forward and aft shroud portions. For example, as will be described below, the expansion joints may be configured to define recesses for receiving the inner and outer arms of the forward and aft shroud portions. Such a configuration may allow the forward shroud portion to expand and/or contract independently of the aft shroud portion during operation of the gas turbine engine.

Additionally, in other embodiments, the shroud segment assembly may include a shroud body configured to generally define a rectangular, box-like cross-sectional shape. Moreover, the shroud body may define a circumferential slot extending lengthwise along the entire circumferential length of the body along its radially inner side or its radially outer side. In such embodiments, an expansion joint may be configured to be received within the circumferential slot so as to provide a coupling link between the portions of the shroud body extending along either side of the slot. Such a configuration may allow the portions of the shroud body divided by the circumferential slot to expand and/or contract independently of one another.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a higher pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

It should be appreciated that each turbine 28, 30 may generally include one or more turbine stages, with each stage including a turbine nozzle (not shown in FIG. 1) and a downstream turbine rotor (not shown in FIG. 1). As will be described below, the turbine nozzle may include a plurality of vanes disposed in an annular array about the centerline axis 12 of the engine 10 for turning or otherwise directing the flow of combustion products through the turbine stage towards a corresponding annular array of rotor blades forming part of the turbine rotor. As is generally understood, the rotor blades may be coupled to a rotor disk of the turbine rotor, which is, in turn, rotationally coupled to the turbine's drive shaft (e.g., drive shaft 30 or 34).

Additionally, as shown in FIG. 1, the fan section 16 of the engine 10 may generally include a rotatable, axial-flow fan rotor 38 that configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor 38 to provide a direct-drive configuration. Alternatively, the second drive shaft 34 may be coupled to the fan rotor 38 via a speed reduction device 37 (e.g., a reduction gear or gearbox) to provide an indirect-drive or geared drive configuration. Such a speed reduction device(s) may also be provided between any other suitable shafts and/or spools within the engine as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
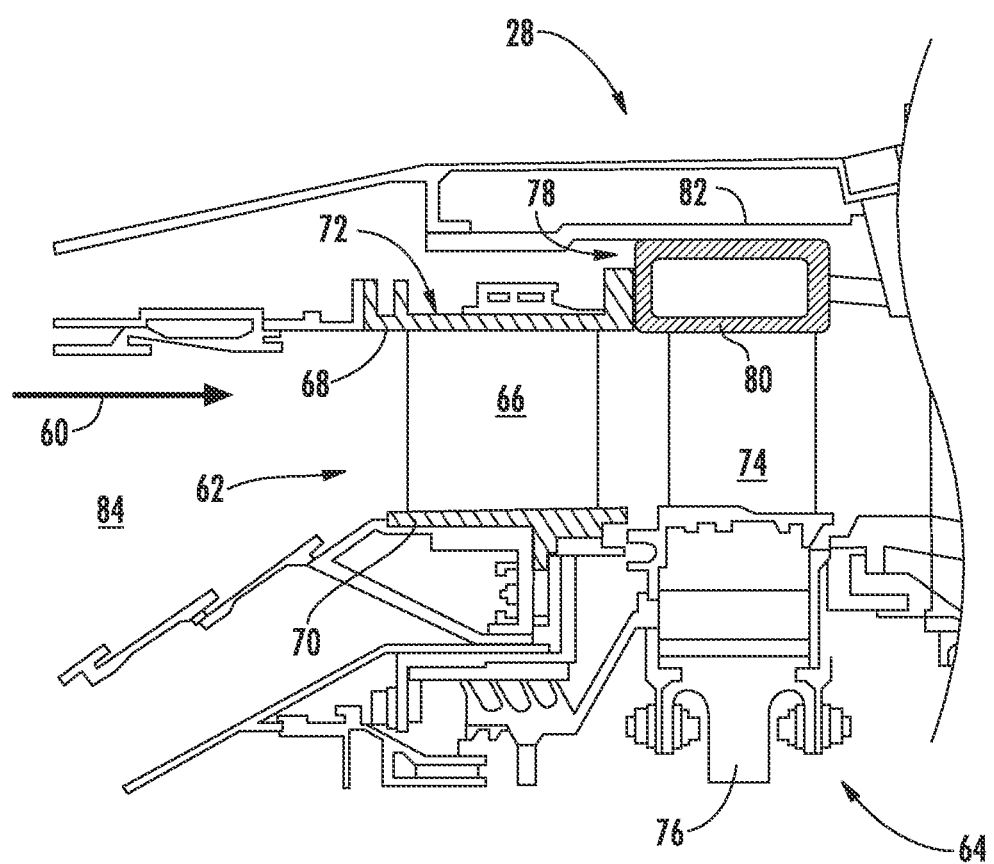
FIG. 2 illustrates a cross-sectional view of one embodiment of a turbine configuration suitable for use within the gas turbine engine shown in FIG. 1.

Referring now to FIG. 2, a partial, cross-sectional view of the first (or high pressure) turbine 28 described above with reference to FIG. 1 is illustrated in accordance with embodiments of the present subject matter. As shown, the first turbine 28 may include a first stage turbine nozzle 62 and a first stage turbine rotor 64. The nozzle 62 may generally be defined by an annular flow channel that includes a plurality of radially-extending, circularly-spaced nozzle vanes 66 (one of which is shown). The vanes 66 may be supported between a number of arcuate outer bands 68 and arcuate inner bands 70. As is generally understood, the vanes 66, outer bands 68 and inner bands 70 may be arranged into a plurality of circumferentially adjoining nozzle segments 72 to form a complete 360 degree assembly, with the outer and inner bands 68, 70 of each nozzle segment 72 generally defining the outer and inner radial flow path boundaries, respectively, for the combustion products (indicated by arrow 60) flowing through the nozzle 72 along the hot gas path of the engine 10.

Additionally, the first stage turbine rotor 64 may include a plurality of circumferentially spaced rotor blades 74 (only one of which is shown in FIG. 2) extending radially outwardly from a rotor disk 76 that rotates about the centerline axis 12 (FIG. 1) of the engine 10. Additionally, a turbine shroud 78 may be positioned immediately adjacent to the radially outer tips of the rotor blades 74 so as to define the outer radial flowpath boundary for the combustion products 60 flowing through the turbine rotor 64 along the hot gas path of the engine 10. The turbine shroud 78 may generally be formed by a plurality of arcuate shroud segments 80 (one of which is shown in FIG. 2), with the shroud segments 80 being arranged circumferentially in an annular array about the centerline axis 12 so as to form a complete 360 degree assembly. As shown in FIG. 2, in several embodiments, each shroud segment 80 may be configured as a "box" shroud segment and, thus, may define a generally rectangular cross-sectional profile. As is generally understood, the shroud segments 80 may, in certain instances, be radially retained relative to the rotor blades 74 via a shroud hanger 82 or other suitable stationary structure that allows for coupling the shroud segments 80 to a casing of the gas turbine engine 10.

During operation, hot gases of combustion 60 may flow in an axial direction from a combustion zone 84 of the combustor 26 (FIG. 1) into the annular, first stage turbine nozzle 62. The nozzle vanes 66 of the first stage turbine nozzle 62 may generally be configured to turn or direct the hot gases so that the flow angularly impinges upon the turbine blades 74 of the first stage rotor 64. The flow of hot gases around the annular array of rotor blades 74 may result in rotation of the turbine rotor 64, which may then rotationally drive the shaft (e.g., the first drive shaft 30 shown in FIG. 1) to which the rotor 64 is coupled.

It should be appreciated that, although only the first stage of the high pressure turbine 28 was generally described above, the turbine 28 may also include any number of follow-up stages including any number of corresponding, sequential annular arrays of nozzle vanes and turbine blades. Similarly, the low pressure turbine 32 (FIG. 1) may also include a similar configuration, with one or more stages of sequential annular arrays of nozzle vanes and turbine blades.

Figure 3:
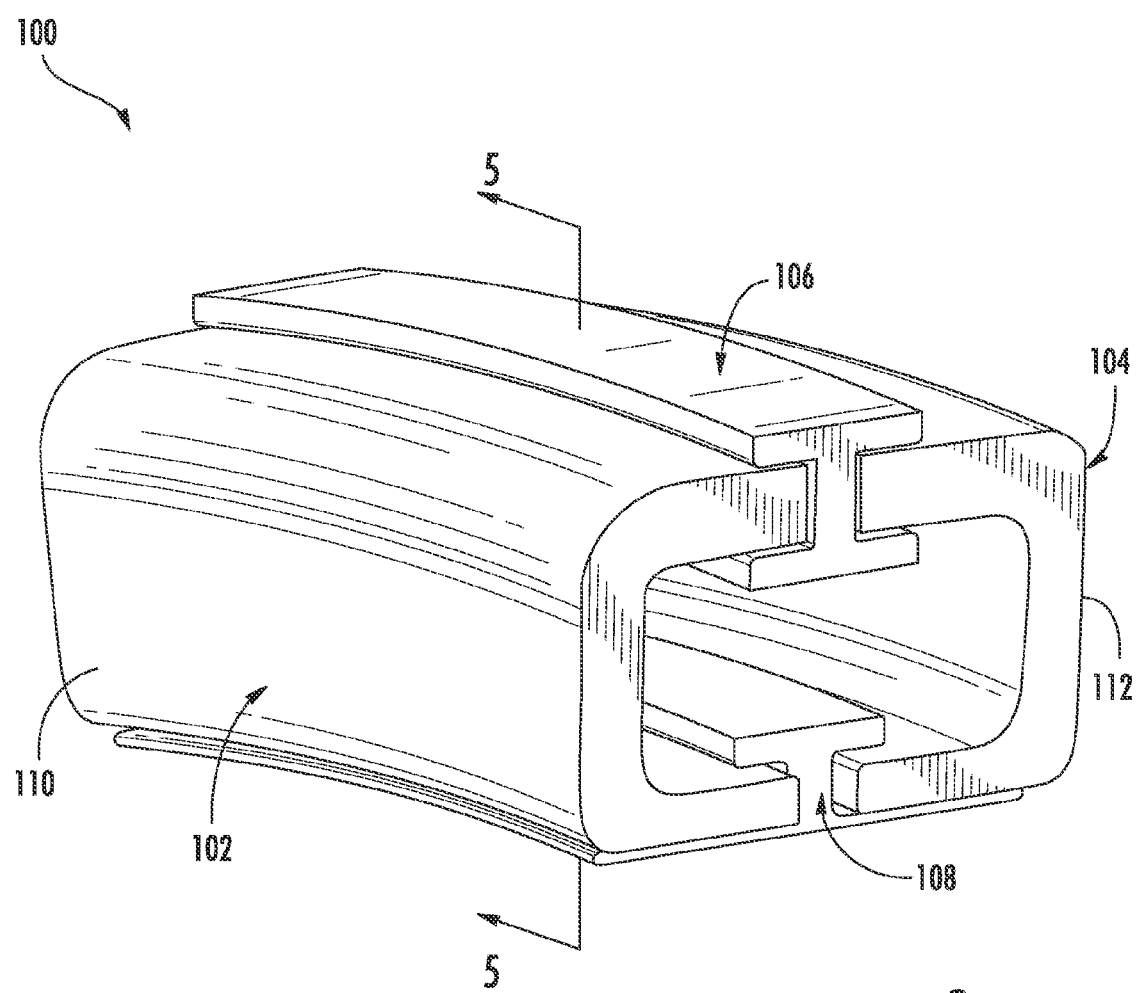
FIG. 3 illustrates an assembled, perspective view of one embodiment of a shroud segment assembly suitable for use within a turbine shroud of a gas turbine engine in accordance with aspects of the present subject matter, particularly illustrating the shroud segment assembly including separate forward and aft shroud portions coupled to one another via first and second expansion joints.
Figure 4:
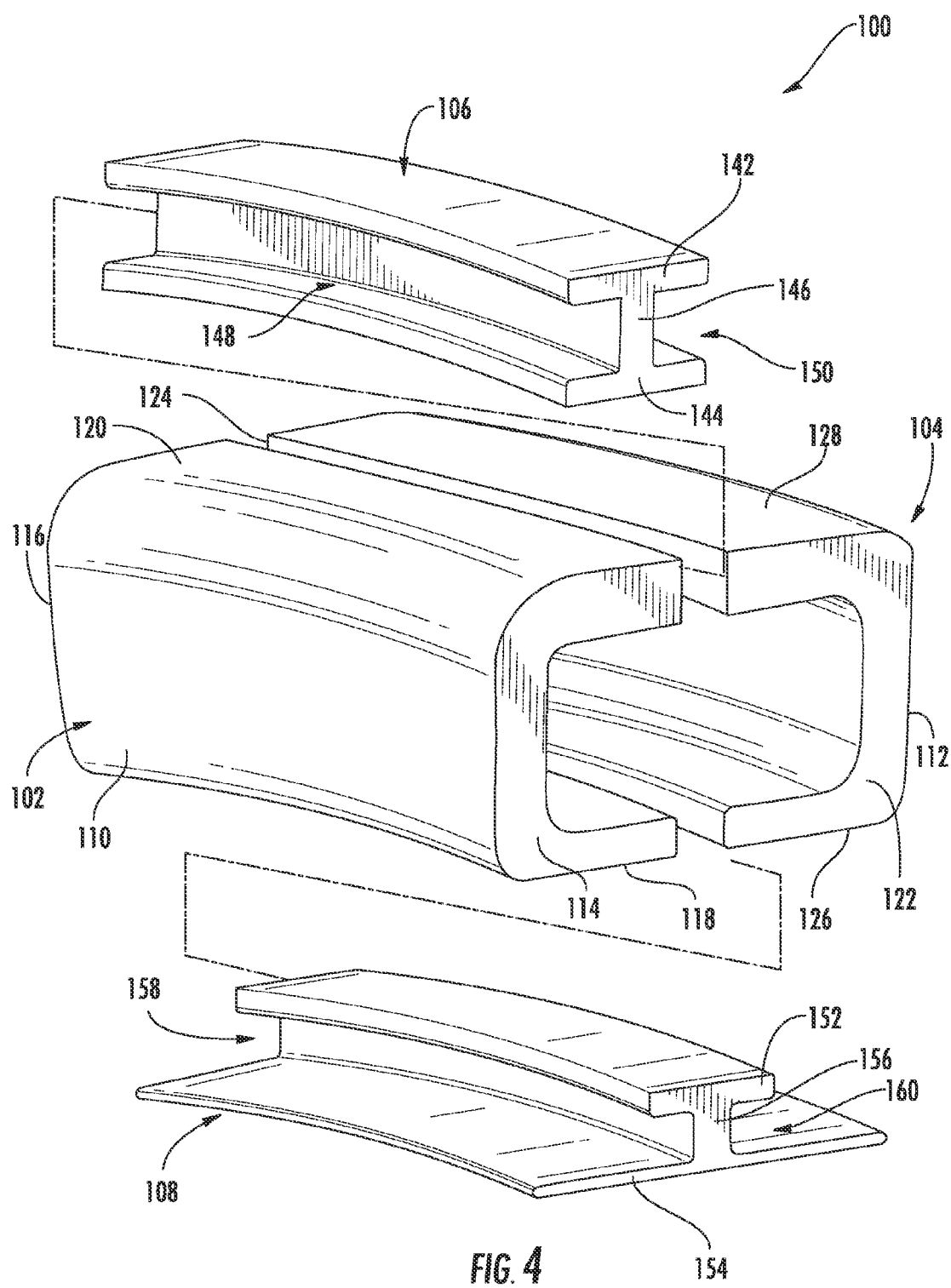
FIG. 4 illustrates an exploded, perspective view of the shroud segment assembly shown in FIG. 3.
Figure 5:
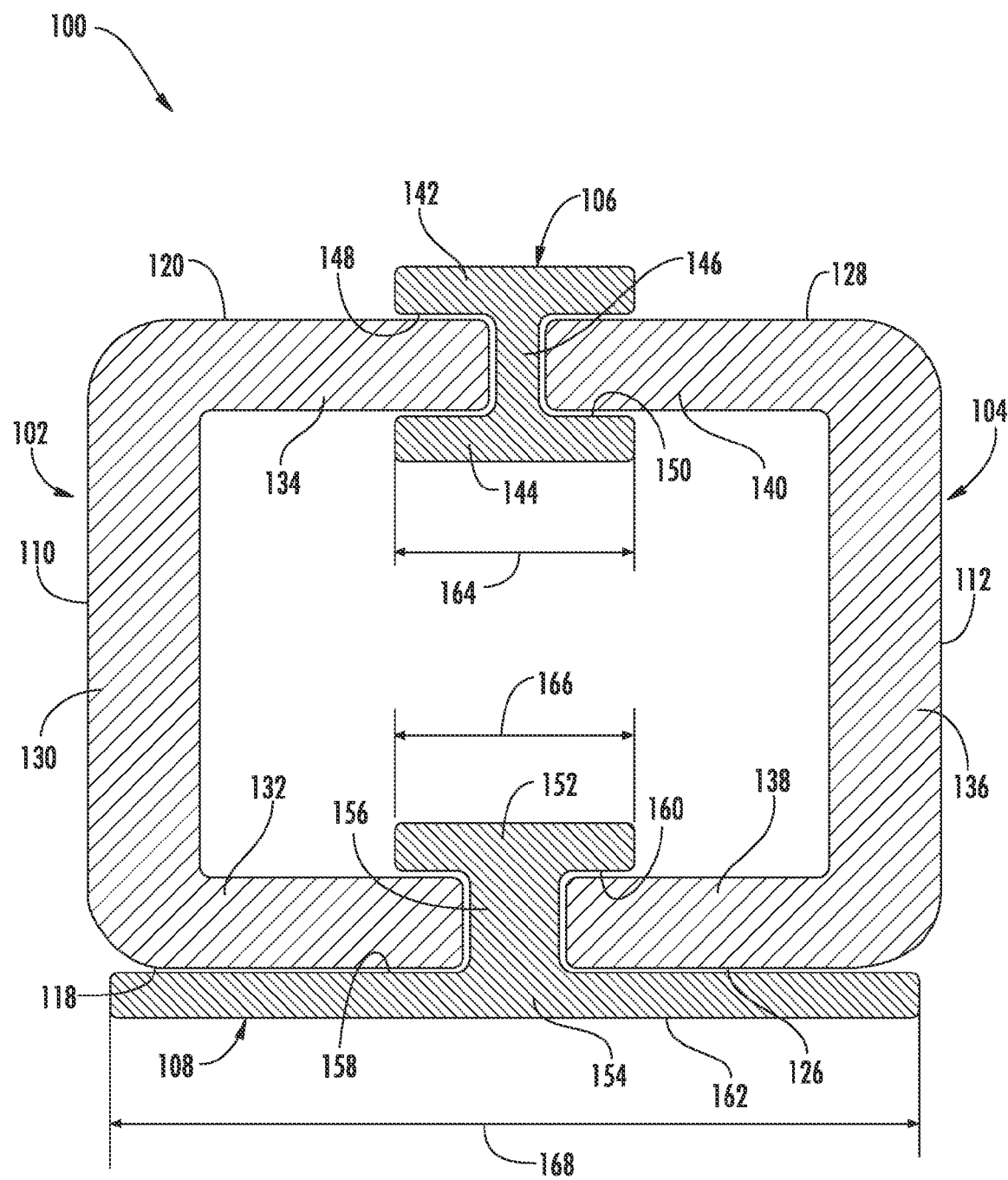
FIG. 5 illustrates a cross-sectional view of the shroud segment assembly shown in FIG. 3 taken about line 5-5.

Referring now to FIGS. 3-5, several views of one embodiment of a shroud segment assembly 100 that may be utilized as an arcuate shroud segment forming part of a turbine shroud of a gas turbine engine are illustrated in accordance with aspects of the present subject matter. Specifically, FIG. 3 illustrates an assembled, perspective view of the shroud segment assembly 100 and FIG. 4 illustrates an exploded, perspective view of the shroud segment assembly 100. Additionally, FIG. 5 illustrates a cross-sectional view of the shroud-segment assembly 100 shown in FIG. 3 taken at line 5-5.

As particularly shown in FIG. 3, when assembled, the shroud segment assembly 100 may generally have a similar configuration and/or shape to a box-type shroud segment. However, unlike conventional box shroud segments, the disclosed shroud segment assembly 100 corresponds to a multi-component assembly including separate forward and aft shroud portions 102, 104 configured to be coupled together via expansion joints 106, 108 to permit the separate shroud portions 102, 104 to expand and contract independently during operation of the gas turbine engine. As a result, even when the shroud segment assembly 100 is subjected to extremely high thermal gradients between its radially inner and outer sides or walls, the thermally-induced strain experienced by each shroud portion 102, 104 of the assembly 100 may be significantly decreased (e.g., as opposed to conventional box shroud segments), thereby reducing the potential for component damage to the shroud segment assembly 100.

As shown in the illustrated embodiment, the forward shroud portion 102 may generally define the forward axial half of the box-shaped shroud segment formed by the assembly 100 and the aft shroud portion 104 may generally define the aft axial half of the box-shaped shroud segment such that the assembly 100 extends axially between a forward surface 110 defined by the forward shroud portion 102 and an aft surface 112 defined by the aft shroud portion 104. Additionally, each shroud portion 102, 104 may be configured to extend circumferentially along an arcuate path between opposed circumferential ends and radially between opposed inner and outer surfaces. For example, as shown in FIG. 4, the forward shroud portion 102 may extend circumferentially between a first forward end 114 and a second forward end 116 and radially between a forward inner surface 118 and a forward outer surface 120. Similarly, the aft shroud portion 102 may extend circumferentially between a first aft end 122 and a second aft end 124 and radially between an aft inner surface 126 and an aft outer surface 128.

As particularly shown in FIG. 5, the forward shroud portion 102 may include a radially extending forward wall 130 and inner and outer arms 132, 134 extending axially from the forward wall 130 in the direction of the aft shroud portion 104 so as to define a "C-shaped" cross-section. As such, a front face of the forward wall 130 may generally define the forward surface 110 of the shroud segment assembly 100 while exterior portions of the inner and outer arms 132, 134 may generally define the forward inner and outer surfaces 118, 120, respectively, of the forward shroud portion 102. Similarly, the aft shroud portion 104 may include a radially extending aft wall 136 and inner and outer arms 138, 140 extending axially from the aft wall 136 in the direction of the forward shroud portion 102 so as to define a backwards "C-shaped" cross-section. As such, a rear face of the aft wall 136 may generally define the aft surface 112 of the shroud segment assembly 100 while exterior portions of the inner and outer arms 138, 140 may generally define the aft inner and outer surfaces 126, 128, respectively, of the aft shroud portion 104.

Additionally, as indicated above, the forward and aft shroud portions 102, 104 may be configured to be coupled to one another via expansion joints 106, 108 extending between the inner and outer arms 132, 138, 134, 140 of the separate shroud portions 102, 104. Specifically, as shown in the illustrated embodiment, the shroud segment assembly 100 may include a first expansion joint 106 positioned between the forward and aft shroud portions 102, 104 such that the joint 106 extends circumferentially between the outer arm 134 of the forward shroud portion 102 and the outer arm 140 of the aft shroud portion 104 along the circumferential length of the assembly 100. Similarly, the shroud segment assembly 100 may also include a second expansion joint 108 positioned between the forward and aft shroud portions 102, 104 such that the joint 108 extends circumferentially between the inner arm 132 of the forward shroud portion 102 and the inner arm 138 of the aft shroud portion 104 along the circumferential length of the assembly 100.

In general, the first expansion joint 106 may define an "I-shaped" cross-section to allow the outer arms 134, 140 of the forward and aft shroud portions 102, 104 to be received between opposed inner and outer walls of the expansion joint 106. Specifically, as shown in the illustrated embodiment, the first expansion joint 106 may include a radially outer wall 142, a radially inner wall 144 and a connecting wall 146 extending between the inner and outer walls 142, 144. As such, the first expansion joint 106 may define a forward recess 148 between its inner and outer walls 142, 144 along a forward side of the connecting wall 146 for receiving the outer arm 134 of the forward shroud portion 102. Similarly, the first expansion joint 106 may define an aft recess 150 between its inner and outer walls 142, 144 along an aft side of the connecting wall 146 for receiving the outer arm 140 of the aft shroud portion 108. Thus, as particularly shown in FIG. 5, when the shroud segment assembly 100 is fully assembled, each outer arm 134, 140 may be received in its respective joint recess 148, 150 such that the outer arms 134, 140 are separated from one another along the circumferential length of the shroud segment assembly 100 by the connecting wall 146 of the first expansion joint 106. In such an embodiment, the radially outer wall 142 of the first expansion joint 106 may generally be configured to extend axially along the outer surfaces 120, 128 of the forward and aft shroud portions 102, 104 (e.g., at a radial location positioned radially outwardly from the outer arms 134, 140) while the radially inner wall 144 of the first expansion joint 106 may be configured to extend axially within the interior of the shroud segment assembly 100 (e.g., at a radial location between the forward and aft walls 130, 136 of the shroud portions 102, 104).

Additionally, in several embodiments, the second expansion joint 108 may generally define a modified "I-shaped" cross-section to allow the inner arms 132, 138 of the forward and aft shroud portions 102, 104 to be received between opposed inner and outer walls of the expansion joint 108. Specifically, as shown in the illustrated embodiment, the second expansion joint 108 may include a radially outer wall 152, a radially inner wall 154 and a connecting wall 156 extending between the inner and outer walls 152, 154. As such, the second expansion joint 108 may define a forward recess 158 between its inner and outer walls 152, 154 along a forward side of the connecting wall 156 for receiving the inner arm 132 of the forward shroud portion 102. Similarly, the second expansion joint 108 may define an aft recess 160 between its inner and outer walls 152, 154 along an aft side of the connecting wall 156 for receiving the inner arm 138 of the aft shroud portion 104. Thus, as particularly shown in FIG. 5, when the shroud segment assembly 100 is fully assembled, each inner arm 132, 138 may be received in its respective joint recess 158, 160 such that the inner arms 132, 138 are separated from one another along the circumferential length of the shroud segment assembly 100 by the connecting wall 156 of the second expansion joint 108. In such an embodiment, the radially inner wall 154 of the second expansion joint 108 may generally be configured to extend axially along the inner surfaces 118, 126 of the forward and aft shroud portions 102, 104 (e.g., at a radial location positioned radially inwardly from the inner arms 132, 138) while the radially outer wall 152 of the second expansion joint 108 may be configured to extend axially within the interior of the shroud segment assembly 100 (e.g., at a radial location between the forward and aft walls 130, 136 of the shroud portions 102, 104). As such, the radially inner wall 154 of the second expansion joint 108 may generally be configured to define an outer radial flowpath surface 162 (FIG. 5) for the combustion gases flowing through the turbine.

As particularly shown in FIG. 5, the radially inner and outer walls 144, 142 of the first expansion joint 106 generally define the same axial length (e.g., as indicated by length 164). In contrast, the radially inner and outer walls 154, 152 of the second expansion joint 108 may define differing axial lengths. For example, as shown in FIG. 5, the radially outer wall 152 may define a first axial length 166 (e.g., by being the same or a similar length as the inner and outer walls 144, 142 of the first expansion joint 106) and the radially inner wall 154 may define a longer, second axial length 168. Specifically, as shown in the illustrated embodiment, the axial length 168 of the radially inner wall 154 of the second expansion joint 108 may be selected such that the radially inner wall 154 extends axially along all or a substantial portion of the overall axial length of the shroud segment assembly 100 defined between its forward and aft surfaces 110, 112. In such an embodiment, the radially inner wall 154 of the second expansion joint 108 may generally be configured to define the entire outer radial flowpath surface 162 for the shroud segment assembly 100.

As indicated above, given the configuration of the shroud segment assembly 100 shown in FIGS. 3-5, the forward shroud portion 102 may be configured to expand and contract independently of the aft shroud portion 104 as the shroud portions 102, 104 are subjected to high thermal gradients during operation of the gas turbine engine. Specifically, the use of the expansion joints 106, 108 may allow the shroud portions 102, 104 to expand/contract axially and/or radially relative to one another without creating excessive thermally induced stains. As a result, the disclosed shroud segment assembly 100 may exhibit improved component life even in extremely high thermal gradient operating conditions.

It should be appreciated that, in addition to the various components and/or features described above, the shroud segment assembly 100 may also include any other suitable components and/or features that facilitate assembly and/or use of the assembly 100 with a gas turbine engine. For example, seal recesses (not shown) may be defined at the first and second circumferential ends 114, 116, 122, 124 of the forward and aft shroud portions 102, 104 for receiving suitable spline seals (not shown). As is generally understood, the spline seals may be utilized to create a sealed interface between adjacent shroud segment assemblies 100 when assembling the shroud segment assemblies 100 in an annular array to form the resulting ring-shaped turbine shroud.

Figure 6:
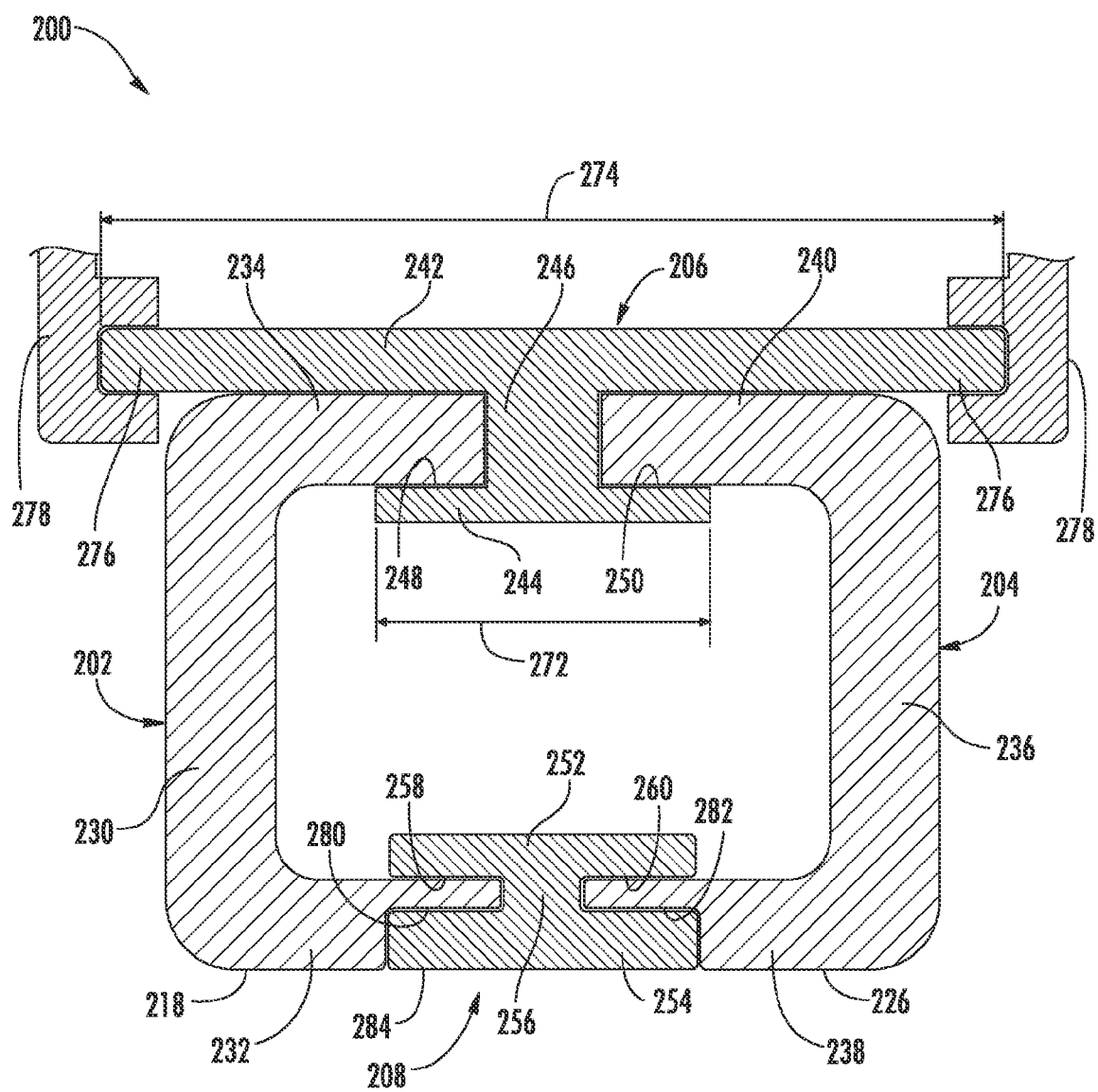
FIG. 6 illustrates a cross-sectional view of another embodiment of a shroud segment assembly suitable for use within a turbine shroud of a gas turbine engine in accordance with aspects of the present subject matter, particularly illustrating the shroud segment assembly including separate forward and aft shroud portions coupled to one another via first and second expansion joints.

Referring now to FIG. 6, an alternative embodiment of the configuration of the shroud segment assembly 100 shown in FIGS. 3-5 is illustrated in accordance with aspects of the present subject matter. As shown in FIG. 6, the shroud segment assembly 200 may be configured similar to the shroud segment assembly 100 describe above. Specifically, the shroud segment assembly 200 may include arcuate forward and aft shroud portions 202, 204 generally defining the forward and aft halves of a box-type shroud segment. As shown, the forward shroud portion 202 may include a forward wall 230 and inner and outer arms 232, 234 extending axially from the forward wall 230 in the direction of the aft shroud portion 204. Similarly, the aft shroud portion 204 may include an aft wall 236 and inner and outer arms 238, 240 extending axially from the aft wall 236 in the direction of the forward shroud portion 202.

Additionally, the shroud segment assembly 200 may include a first expansion joint 206 positioned between the forward and aft shroud portions 202, 204 such that the joint 206 extends circumferentially between the outer arm 234 of the forward shroud portion 202 and the outer arm 240 of the aft shroud portion 204 along the circumferential length of the assembly 200. Similarly, the shroud segment assembly 200 may also include a second expansion joint 208 positioned between the forward and aft shroud portions 202, 204 such that the joint 208 extends circumferentially between the inner arm 232 of the forward shroud portion 202 and the inner arm 238 of the aft shroud portion 204 along the circumferential length of the assembly 200.

As shown in the illustrated embodiment, the first expansion joint 206 may generally define a modified "I-shaped" cross-section to allow the outer arms 234, 240 of the forward and aft shroud portions 202, 204 to be received between opposed inner and outer walls of the expansion joint 206. Specifically, as shown in the illustrated embodiment, the first expansion joint 206 may include a radially outer wall 242, a radially inner wall 244 and a connecting wall 246 extending between the inner and outer walls 242, 44. As such, the outer arms 234, 240 of the forward and aft portions 202, 204 may be configured to be received within corresponding recesses 248, 250 defined between the radially inner and outer walls 244, 242 such that the outer arms 234, 240 are separated from one another along the circumferential length of the shroud segment assembly 200 by the connecting wall 246 of the first expansion joint 206.

As shown in FIG. 6, the radially inner and outer walls 244, 242 of the first expansion joint 206 may define differing axial lengths. For example, in the illustrated embodiment, the radially inner wall 244 may define a first axial length 272 and the radially outer wall 242 may define a longer, second axial length 274. Specifically, as shown in FIG. 6, the axial length 274 of the radially outer wall 242 of the first expansion joint 206 may be selected such that the radially outer wall 242 extends axially along all or a substantial portion of the overall axial length of the shroud segment assembly 200 defined between its forward and aft walls 230, 236. Such an extended outer wall 242 may be desired, for example, to facilitate supporting the shroud segment assembly 200 within the turbine via a shroud hanger or other suitable structure. For example, as shown in FIG. 6, in one embodiment, opposed axial ends 276 of the radially outer wall 242 of the first expansion joint 206 may be configured to be supported by portions of a corresponding shroud hanger 278 (e.g., by configuring the hanger to include recesses for receiving the ends 276 or by using C-clips to couple the ends 276 to the hanger 278) to allow the shroud segment assembly 200 to be coupled to a casing or other stationary structure of the turbine.

Additionally, as shown in FIG. 6, the second expansion joint 208 may generally define an "I-shaped" cross-section to allow the inner arms 232, 238 of the forward and aft shroud portions 202, 204 to be received between opposed inner and outer walls of the expansion joint 208. Specifically, as shown in the illustrated embodiment, the second expansion joint 208 may include a radially outer wall 252, a radially inner wall 254 and a connecting wall 256 extending between the inner and outer walls 252, 252. As such, the inner arms 232, 238 of the forward and aft portions 202, 204 may be configured to be received within corresponding recesses 258, 260 defined between the radially inner and outer walls 254, 252 such that the inner arms 232, 238 are separated from one another along the circumferential length of the shroud segment assembly 200 by the connecting wall 256 of the second expansion joint 208. g As shown in FIG. 6, unlike the second expansion joint 108 described above with reference to FIGS. 3-5, the radially inner wall 254 of the second expansion joint 208 is configured to be radially aligned with at least a portion of the inner arms 232, 238 of the forward and aft shroud portions 202, 204. Specifically, in several embodiments, the inner arms 232, 238 of the shroud portions 202, 204 may be configured to define opposed joint recesses 280, 282 for recessing the radially inner wall 254 of the second expansion joint 208. For example, as shown in FIG. 6, the inner arm 232 of the forward shroud portion 202 may define a forward joint recess 280 and the inner arm 238 of the aft shroud portion 204 may define an aft joint recess 282. As such, when the shroud segment assembly 100 is fully assembled, the radially inner wall 254 of the second expansion joint 208 may be received within the opposed joint recesses 280, 282. In such an embodiment, an inner joint surface 284 defined by the radially inner wall 254 of the second expansion joint 208 may be configured to be radially aligned with corresponding radially inner surfaces 218, 226 of the forward and aft shroud portions 202, 204. As a result, the radially inner surfaces 218, 226 of the forward and aft shroud portions 202, 204, along with the inner joint surface 284 of the second expansion joint 208, may collectively define an outer radial flowpath surface for the combustion gases flowing through the turbine.

It should be appreciated that the various expansion joints 106, 108, 206, 208 shown in FIGS. 3-6 may be utilized in any other suitable combination(s) in order to form differing embodiments of a shroud segment assembly in accordance with aspects of the present subject matter. For example, in one embodiment, the first expansion joint 106 shown in FIGS. 3-5 may be utilized in combination with the second expansion joint 208 shown in FIG. 6 in order to couple the forward and aft shroud portions to one another. In another embodiment, the first expansion joint 206 shown in FIG. 6 may be utilized in combination with the second expansion joint 108 shown in FIGS. 3-5 in order to couple the forward and aft shroud portions to one another.

Figure 7:
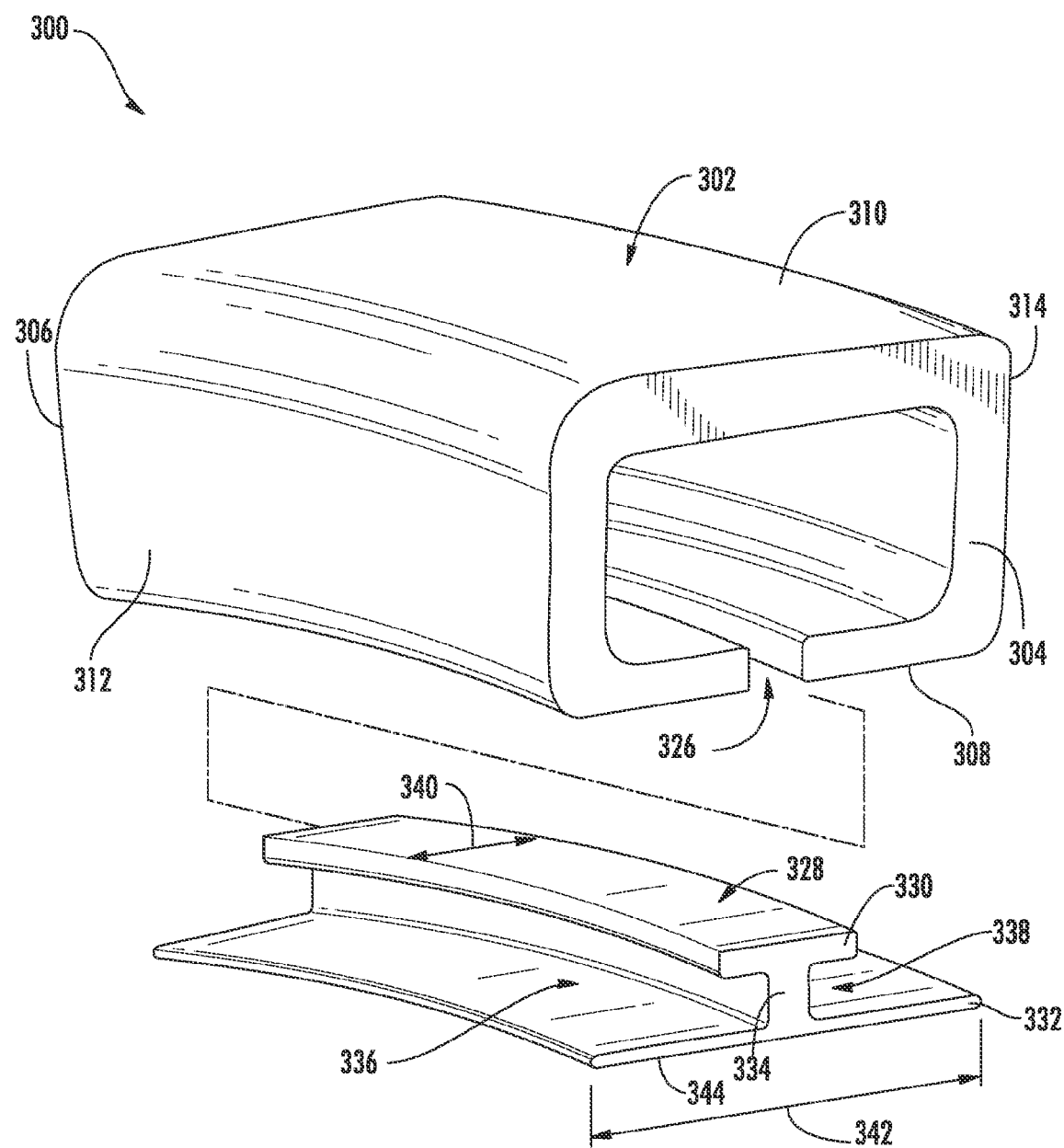
FIG. 7 illustrates an exploded, perspective view of a further embodiment of a shroud segment assembly suitable for use within a turbine shroud of a gas turbine engine in accordance with aspects of the present subject matter, particularly illustrating the shroud segment assembly including a shroud body defining a circumferential slot along a radially inner side of the body for receiving an expansion joint.
Figure 8:
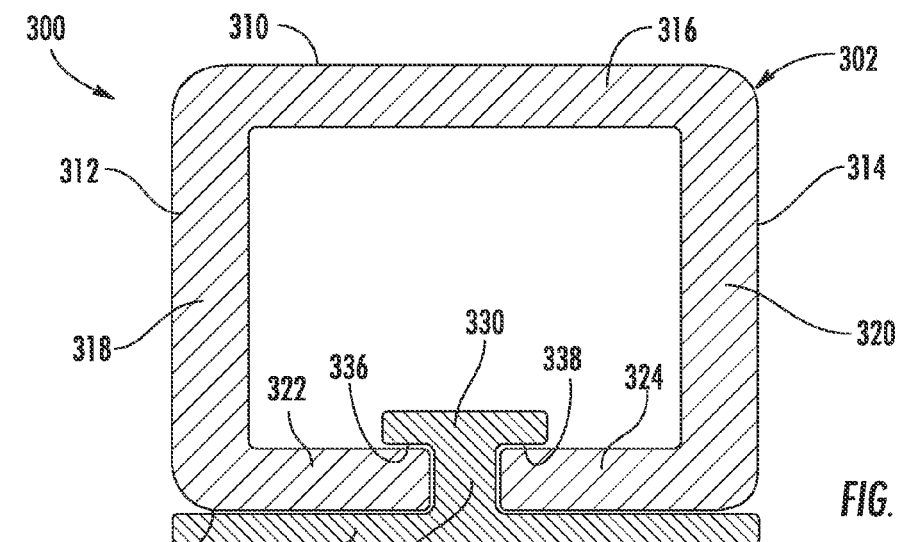
FIG. 8 illustrates a cross-sectional view of the shroud segment assembly shown in FIG. 7 as assembled.

Referring now to FIGS. 7 and 8, one embodiment of a differing configuration for a shroud segment assembly 300 is illustrated in accordance with aspects of the present subject matter. Specifically, FIG. 7 illustrates an exploded, perspective view of the shroud segment assembly 300 and FIG. 8 illustrates a cross-sectional view of the shroud segment assembly 300 shown in FIG. 7 as assembled.

Unlike the configuration described above in which the primary box shroud is divided into forward and aft shroud portions, the illustrated shroud segment assembly 300 includes a single shroud body 302 configured to define the generally rectangular cross-sectional shape of a box-type shroud segment. As shown in FIG. 7, the shroud body 302 may generally be configured to extend circumferentially along an arcuate path between first and second circumferential ends 304, 306 and radially between opposed inner and outer sides 308, 310. In addition, the shroud body 302 may generally be configured to extend axially between a forward surface 312 and an aft surface 314.

As particularly shown in FIG. 8, the shroud body 302 may include an outer wall 316 extending axially along the radially outer side 310 of the shroud body 302 and forward and aft walls 318, 320 extending radially inwardly from the outer wall 316 so as to define the forward and aft surfaces 312, 314 of the shroud body 302 respectively. In addition, the shroud body 302 includes a first inner arm 322 extending axially from the forward wall 318 in the direction of the aft wall 320 so as to define a forward portion of the radially inner side 308 of the shroud body 302. Similarly, the shroud body 302 includes a second inner arm 324 extending axially from the aft wall 320 in the direction of the forward wall 318 so as to define an aft portion of the radially inner side 308 of the shroud body 302. As shown in the illustrated embodiment, the first and second inner arms 322, 324 may be spaced axially apart such that a circumferential slot 326 (FIG. 7) is defined between the inner arms 322, 324 that extends along the entire circumferential length of the shroud body 302 (e.g., the length defined between the opposed circumferential ends 304, 306 of the shroud body 302). As such, the circumferential slot 326 may separate the first and second inner arms 322, 324 from one another along the radially inner side 308 of the shroud body 302, thereby allowing the inner arms 322, 324 to expand and contract independently without transmitting thermally induced strain between one another.

Additionally, as shown in FIGS. 7 and 8, the shroud segment assembly 300 may also include an expansion joint 328 configured to be received within the circumferential slot 326. As shown in the illustrated embodiment, the expansion joint is configured the same as the second expansion joint 108 described above with reference to FIGS. 3-5. Thus, the expansion joint 328 may generally define a modified "I-shaped" cross-section to allow the inner arms 322, 324 of the shroud body 302 to be received between opposed inner and outer walls of the expansion joint 328. Specifically, as shown in the illustrated embodiment, the expansion joint 328 may include a radially outer wall 330, a radially inner wall 332 and a connecting wall 334 extending between the inner and outer walls 330, 332. As such, when fully assembled, the inner arms 322, 324 of the shroud body 302 may be configured to be received within corresponding recesses 336, 338 defined between the radially inner and outer walls 332, 330 of the expansion joint 328.

Additionally, in several embodiments, the radially inner and outer walls 332, 330 of the expansion joint 328 may define differing axial lengths. For example, as shown in FIG. 7, the radially outer wall 330 may define a first axial length 340 and the radially inner wall 332 may define a longer, second axial length 342. Specifically, as shown in the illustrated embodiment, the axial length 342 of the radially inner wall 332 of the expansion joint 328 may be selected such that the radially inner wall 332 extends axially along all or a substantial portion of the overall axial length of the shroud body 302 defined between its forward and aft surfaces 312, 314. In such an embodiment, the radially inner wall 332 of the expansion joint 328 may generally be configured to define an outer radial flowpath surface 344 for the shroud segment assembly 300.

Figure 9:
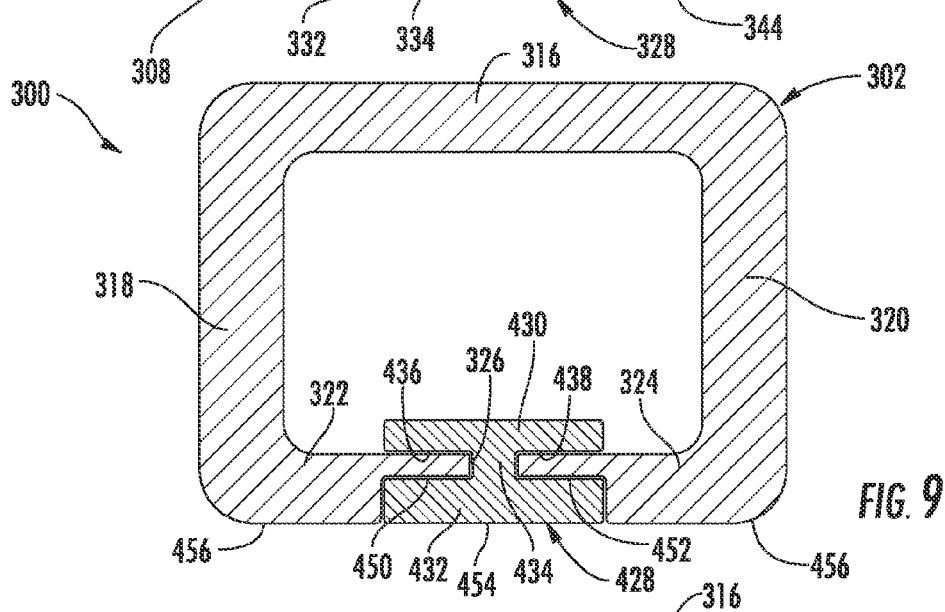
FIG. 9 illustrates a cross-sectional view of yet another embodiment of a shroud segment assembly suitable for use within a turbine shroud of a gas turbine engine in accordance with aspects of the present subject matter, particularly illustrating the shroud segment assembly including a shroud body defining a circumferential slot along a radially inner side of the body for receiving an expansion joint.
Figure 10:
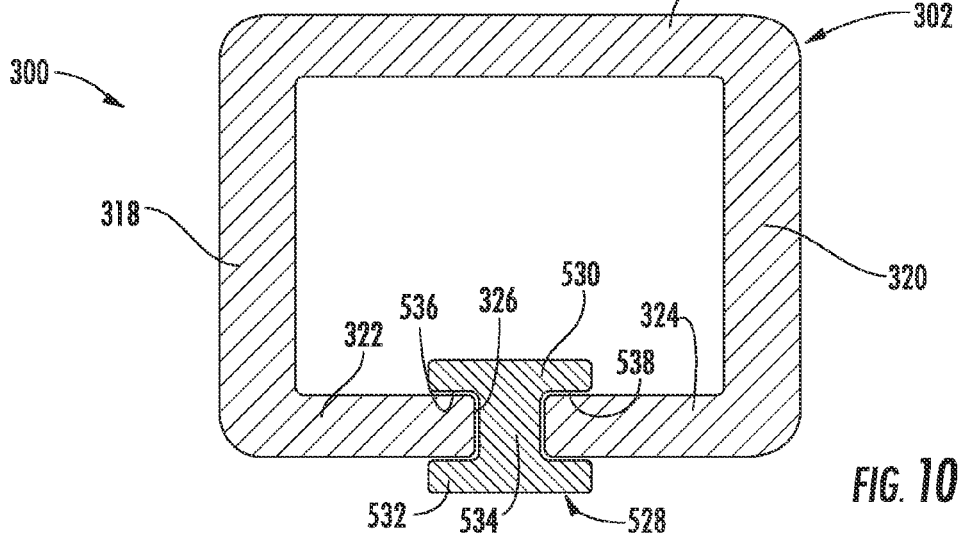
FIG. 10 illustrates a cross-sectional view of an additional embodiment of a shroud segment assembly suitable for use within a turbine shroud of a gas turbine engine in accordance with aspects of the present subject matter, particularly illustrating the shroud segment assembly including a shroud body defining a circumferential slot along a radially inner side of the body for receiving an expansion joint.

Referring now to FIGS. 9 and 10, cross-sectional views of alternative embodiments of the shroud segment assembly 300 shown in FIGS. 7 and 8 are illustrated in accordance with aspects of the present subject matter. For example, as shown in FIG. 9, the shroud segment assembly 300 includes an expansion joint 428 configured the same as the second expansion joint 208 described above with reference to FIG. 6. Specifically, the expansion joint 428 generally includes a radially outer wall 430, a radially inner wall 432 and a connecting wall 434 extending between the inner and outer walls 432, 430. As such, when assembled, the inner arms 322, 324 of the shroud body 302 may be configured to be received within corresponding recesses 436, 438 defined between the radially inner and outer walls 432, 430 of the expansion joint 428.

Additionally, as shown in FIG. 9, unlike the expansion joint 328 described above with reference to FIGS. 7 and 8, the radially inner wall 432 of the expansion joint 428 is configured to be radially aligned with at least a portion of the inner arms 322, 324 of the shroud body 302. Specifically, in several embodiments, the inner arms 322, 324 of the shroud body 302 may be configured to define opposed joint recesses 450, 452 for recessing the radially inner wall 432 of the expansion joint 428. For example, as shown in FIG. 9, the first inner arm 322 may define a forward joint recess 450 and the second inner arm 324 may define an aft joint recess 452. As such, when the shroud segment assembly 300 is assembled, the radially inner wall 432 of the expansion joint 428 may be received within the opposed joint recesses 450, 452. In such an embodiment, an inner joint surface 454 defined by the radially inner wall 432 may be configured to be radially aligned with corresponding radially inner surfaces 456 of the inner arms 322, 324 of the shroud body 302. As a result, the radially inner surfaces 456 of the shroud body 302, along with the inner joint surface 454 of the expansion joint 428, may collectively define an outer radial flowpath surface 344 for the combustion gases flowing through the turbine.

Similarly, FIG. 10 illustrates the shroud segment assembly 300 including an expansion joint 528 configured similarly to the expansion joint 428 described above with reference to FIG. 9. Specifically, the expansion joint 528 generally includes a radially outer wall 530, a radially inner wall 532 and a connecting wall 534 extending between the inner and outer walls 530, 532. As such, when assembled, the inner arms 322, 324 of the shroud body 302 may be configured to be received within corresponding recesses 536, 538 defined between the radially inner and outer walls 532, 530 of the expansion joint 528. However, unlike the recessed expansion joint 428 described above, the radially inner wall 532 of the expansion joint 528 is configured to be disposed radially inwardly from the inner arms 322, 324 such that the inner wall 532 extends axially along the radially inner surface of the shroud body 302.

Figure 11:
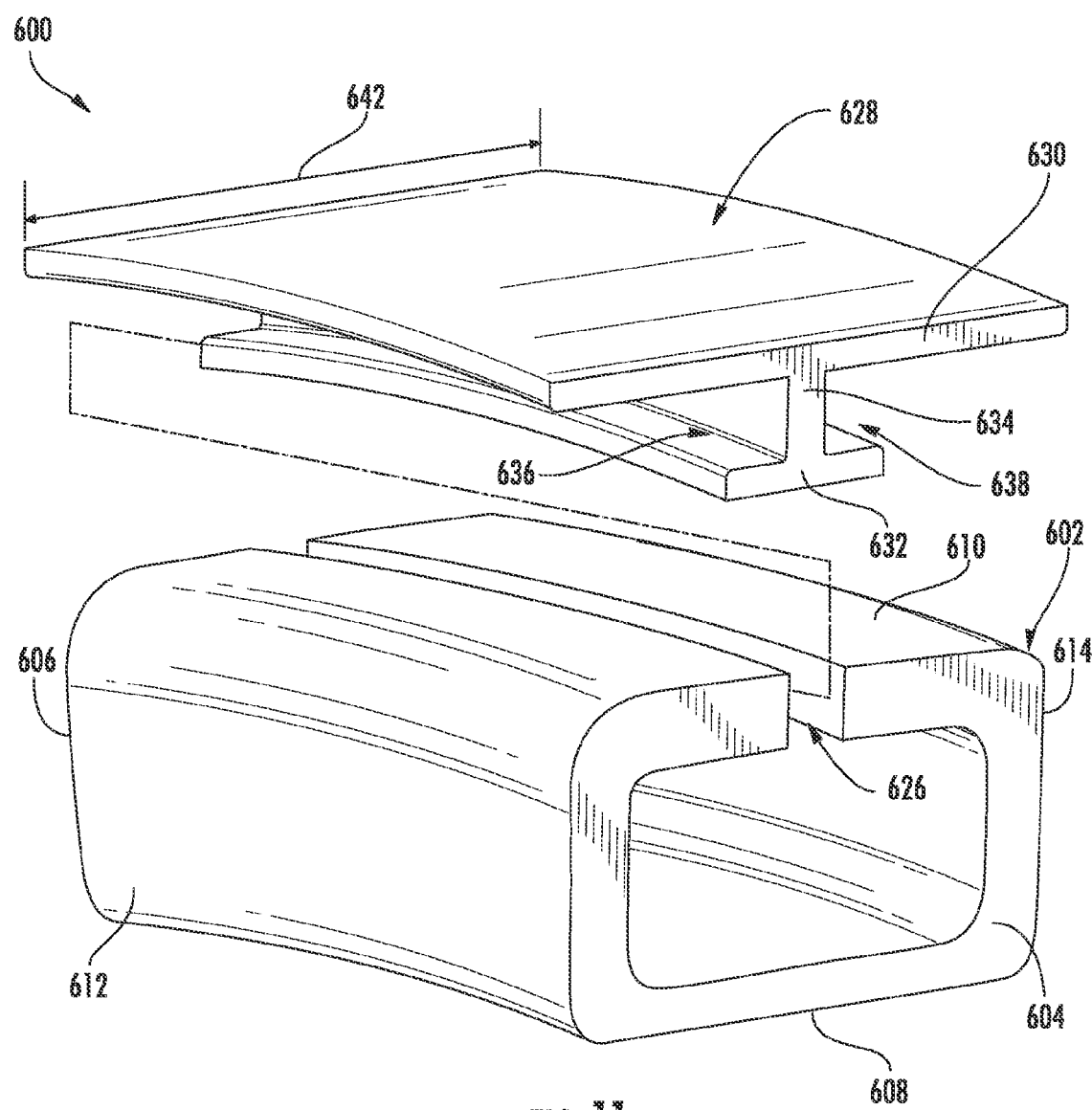
FIG. 11 illustrates an exploded, perspective view of an even further embodiment of a shroud segment assembly suitable for use within a turbine shroud of a gas turbine engine in accordance with aspects of the present subject matter, particularly illustrating the shroud segment assembly including a shroud body defining a circumferential slot along a radially outer side of the body for receiving an expansion joint.
Figure 12:
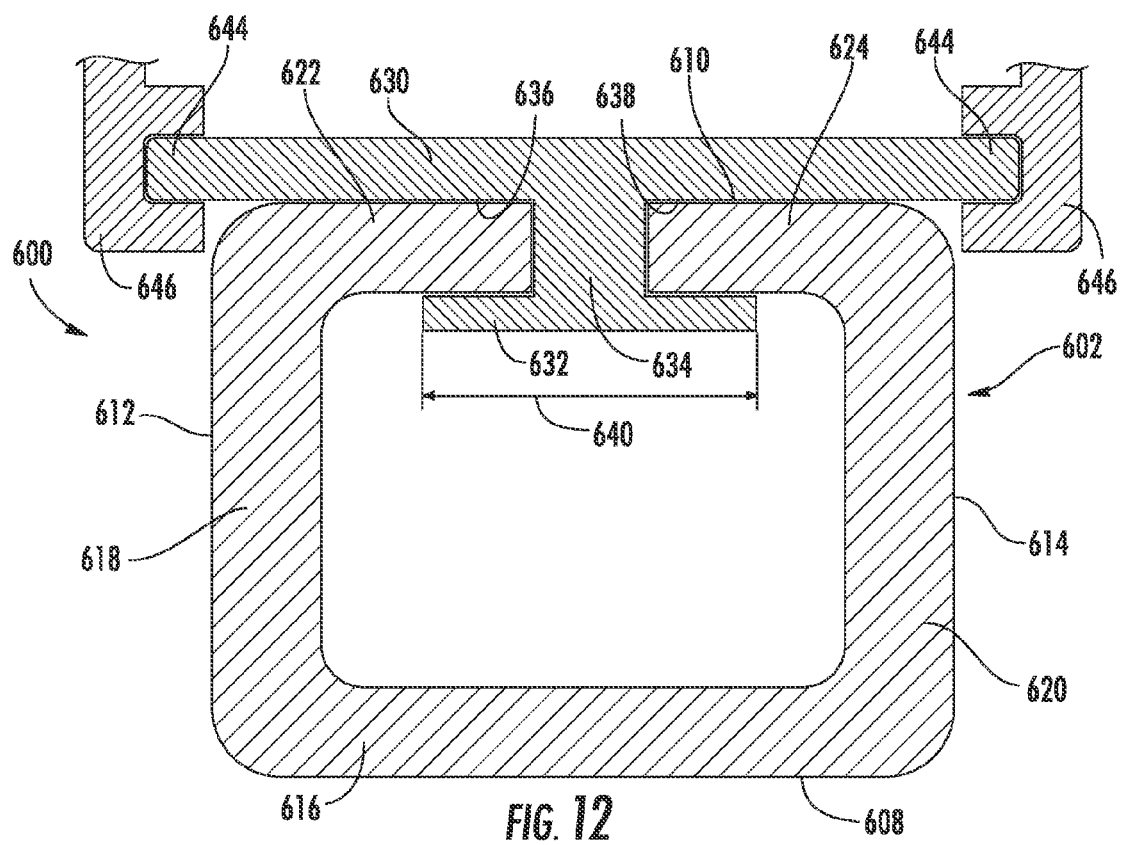
FIG. 12 illustrates a cross-sectional view of the shroud segment assembly shown in FIG. 11 as assembled.

Referring now to FIGS. 11 and 12, one embodiment of a differing configuration for a shroud segment assembly 600 is illustrated in accordance with aspects of the present subject matter. Specifically, FIG. 11 illustrates an exploded, perspective view of the shroud segment assembly 600 and FIG. 12 illustrates a cross-sectional view of the shroud segment assembly 600 shown in FIG. 11 as assembled.

Similar to the configuration described above with reference to FIGS. 7-10, the illustrated shroud segment assembly 600 includes a single shroud body 602 configured to define the generally rectangular cross-sectional shape of a box-type shroud segment. As shown in FIG. 11, the shroud body 602 may generally be configured to extend circumferentially along an arcuate path between first and second circumferential ends 604, 606 and radially between opposed inner and outer sides 608, 610. In addition, the shroud body 602 may generally be configured to extend axially between a forward surface 612 and an aft surface 614.

As particularly shown in FIG. 12, the shroud body 602 may include an inner wall 616 extending axially along the radially inner side 608 of the shroud body 602 and forward and aft walls 618, 620 extending radially outwardly from the inner wall 616 so as to define the forward and aft surfaces 612, 614 of the shroud body 602, respectively. In addition, the shroud body 602 includes a first outer arm 622 extending axially from the forward wall 618 in the direction of the aft wall 620 so as to define a forward portion of the radially outer side 610 of the shroud body 602. Similarly, the shroud body 602 includes a second outer arm 624 extending axially from the aft wall 620 in the direction of the forward wall 618 so as to define an aft portion of the radially outer side 610 of the shroud body 602. As shown in the illustrated embodiment, the first and second outer arms 622, 624 may be spaced axially apart such that a circumferential slot 626 (FIG. 11) is defined between the outer arms 622, 624 that extends along the entire circumferential length of the shroud body 602 (e.g., the length defined between the opposed circumferential ends 604, 606 of the shroud body 602). As such, the circumferential slot 626 may separate the first and second outer arms 622, 624 from one another along the radially outer side 610 of the shroud body 602, thereby allowing the outer arms 622, 624 to expand and contract independently without transmitting thermally induced strain therebetween.

Additionally, as shown in FIGS. 11 and 12, the shroud segment assembly 600 may also include an expansion joint 628 configured to be received within the circumferential slot 626. As shown in the illustrated embodiment, the expansion joint 628 is configured the same as the first expansion joint 206 described above with reference to FIG. 6. Thus, the expansion joint 626 generally defines a modified "I-shaped" cross-section to allow the outer arms 622, 624 of the shroud body 602 to be received between opposed inner and outer walls of the expansion joint 628. Specifically, as shown in the illustrated embodiment, the expansion joint 628 may include a radially outer wall 630, a radially inner wall 632 and a connecting wall 634 extending between the inner and outer walls 632, 630. As such, when fully assembled, the outer arms 622, 624 of the shroud body 602 may be configured to be received within corresponding recesses 636, 638 defined between the radially inner and outer walls 632, 630 of the expansion joint 628.

Moreover, as particularly shown in FIG. 12, the radially inner and outer walls 632, 630 of the expansion joint 628 may define differing axial lengths. Specifically, the radially inner wall 632 may define a first axial length 640 (FIG. 12) and the radially outer wall 630 may define a longer, second axial length 642 (FIG. 11). For example, as shown in the illustrated embodiment, the axial length 642 of the radially outer wall 630 of the expansion joint 628 may be selected such that the radially outer wall 630 extends axially along all or a substantial portion of the overall axial length of the shroud segment assembly 600 defined between the forward and aft surfaces 612, 614 of the shroud body 602. As indicated above, such an extended outer wall 630 may be desired, for example, to facilitate supporting the shroud segment assembly 600 within the turbine. For example, as shown in FIG. 12, in one embodiment, opposed axial ends 644 of the radially outer wall 630 of the expansion joint 628 may be configured to be supported by portions of a corresponding shroud hanger 646 (e.g., by configuring the hanger 646 to include recesses for receiving the ends 644 or by using C-clips to couple the ends 644 to the hanger 646) to allow the shroud segment assembly 600 to be coupled to a casing or other stationary structure of the turbine.

Figure 13:
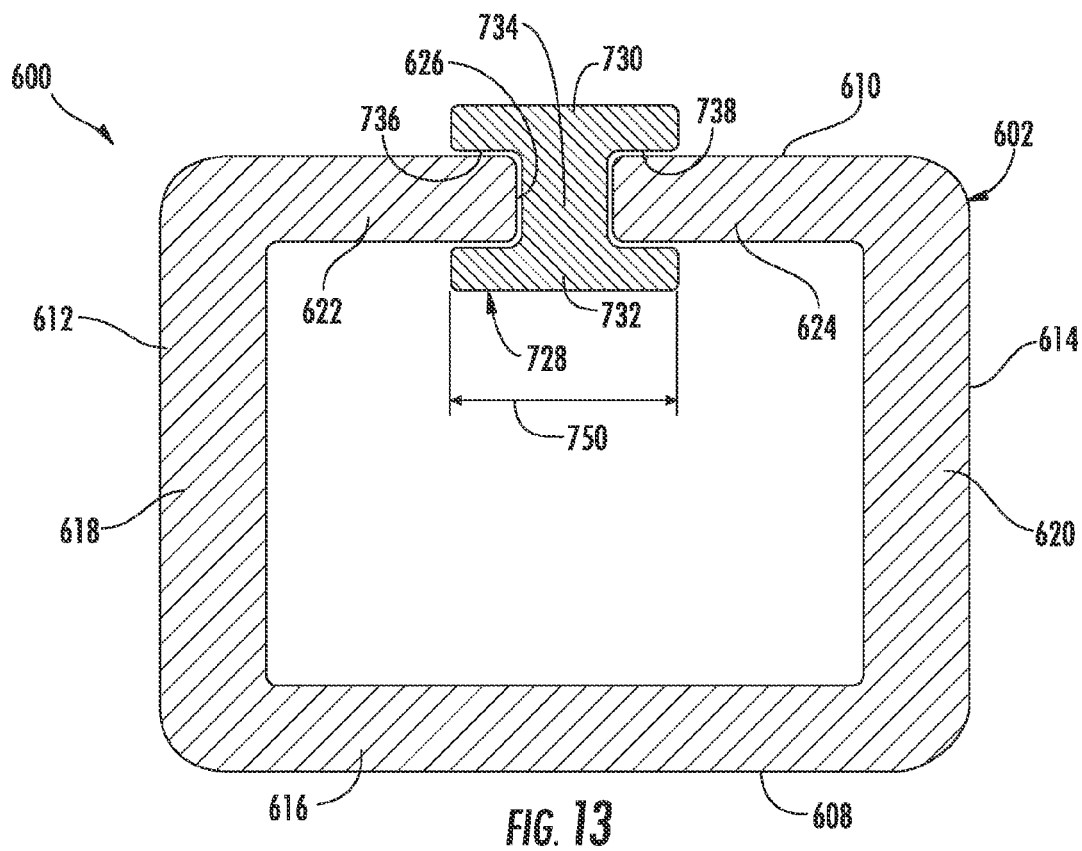
FIG. 13 illustrates a cross-sectional view of another embodiment of a shroud segment assembly suitable for use within a turbine shroud of a gas turbine engine in accordance with aspects of the present subject matter, particularly illustrating the shroud segment assembly including a shroud body defining a circumferential slot along a radially outer side of the body for receiving an expansion joint.

Referring now to FIG. 13, a cross-sectional view of an alternative embodiment of the shroud segment assembly 600 shown in FIGS. 11 and 12 is illustrated in accordance with aspects of the present subject matter. Specifically, as shown in FIG. 13, the shroud segment assembly 600 includes an expansion joint 728 configured the same as the first expansion joint 106 described above with reference to FIGS. 3-5. Specifically, the expansion joint 728 generally includes a radially outer wall 730, a radially inner wall 732 and a connecting wall 734 extending between the inner and outer walls 732, 730. As such, when assembled, the inner arms 622, 624 of the shroud body 602 may be configured to be received within corresponding recesses 736, 738 defined between the radially inner and outer walls 732, 730 of the expansion joint 728. Additionally, as shown in FIG. 13, the radially inner and outer walls 732, 730 generally define the same axial length (e.g., axial length 750 indicated in FIG. 13).

It should be appreciated that the various shroud portions and shroud bodies described herein may generally be formed from any suitable material. However, in several embodiments, the shroud portions and/or bodies may be formed from a non-metallic composite material. For instance, in a particular embodiment, the shroud portions and/or bodies may be formed from a ceramic matrix composite (CMC) material. In such an embodiment, the CMC material used to form the shroud portions and/or bodies may generally correspond to any suitable CMC material known in the art and, thus, may generally include a ceramic matrix having a suitable reinforcing material incorporated therein to enhance the material's properties (e.g., the material strength and/or the thermo-physical properties). In one embodiment, the CMC material used may be configured as a continuous fiber reinforced CMC material. For example, suitable continuous fiber reinforced CMC materials may include, but are not limited to, CMC materials reinforced with continuous carbon fibers, oxide fibers, silicon carbide monofilament fibers and other CMC materials including continuous fiber lay-ups and/or woven fiber preforms. In other embodiments, the CMC material used may be configured as a discontinuous reinforced CMC material. For instance, suitable discontinuous reinforced CMC materials may include, but are not limited to, particulate, platelet, whisker, discontinuous fiber, in situ and nano-composite reinforced CMC materials.

It should be appreciated that the present subject matter is also directed to a method for assembling a shroud segment assembly for use within a gas turbine engine. In one embodiment, the method may include positioning forward and aft shroud portions of the shroud segment assembly relative to a first expansion joint of the shroud segment assembly such that outer arms of the shroud portions are received within corresponding recesses of the first expansion joint. In addition, the method may include positioning the forward and aft shroud portions relative to a second expansion joint of the shroud segment assembly such that inner arms of the shroud portions are received within corresponding recesses of the second expansion joint.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shroud segment assembly for use within a turbine shroud of a gas turbine engine, the shroud segment assembly comprising:
   a forward shroud portion extending circumferentially between a first forward end and a second forward end, the forward shroud portion including a forward outer arm and a forward inner arm extending from a forward wall of the forward shroud portion;
   a separate aft shroud portion extending circumferentially between a first aft end and a second aft end, the aft shroud portion including an aft outer arm and an aft inner arm extending from an aft wall of the aft shroud portion;
   a first expansion joint positioned between the forward and aft shroud portions such that the first expansion joint extends circumferentially between the forward outer arm of the forward shroud portion and the aft outer arm of the aft shroud portion; and
   a second expansion joint positioned between the forward and aft shroud portions such that the second expansion joint extends circumferentially between the forward inner arm of the forward shroud portion and the aft inner arm of the aft shroud portion,
   wherein the first expansion joint includes a radially outer wall, a radially inner wall and a connecting wall extending between the radially inner and outer walls, the first expansion joint defining a forward recess between the radially inner and outer walls along a forward side of the connecting wall, the first expansion joint further defining an aft recess between the radially inner and outer walls along an aft side of the connecting wall, and
   wherein ends of the radially outer wall of the first expansion joint are configured to be supported by a hanger of the gas turbine engine.

2. The shroud segment assembly of claim 1, wherein the forward outer arm is configured to be received within the forward recess and the aft outer arm is configured to be received within the aft recess.

3. The shroud segment assembly of claim 1, wherein the second expansion joint includes a radially outer wall, a radially inner wall and a connecting wall extending between the radially inner and outer walls, the second expansion joint defining a forward recess between the radially inner and outer walls along a forward side of the connecting wall, the second expansion joint further defining an aft recess between the radially inner and outer walls along an aft side of the connecting wall.

4. The shroud segment assembly of claim 3, wherein the forward inner arm is configured to be received within the forward recess of the second expansion joint and the aft inner arm is configured to be received within the aft recess of the second expansion joint.

5. The shroud segment assembly of claim 3, wherein the forward inner arm defines a forward joint recess and the aft inner arm defines an aft joint recess, the radially inner wall of the second expansion joint extending between the forward and aft inner arms so as to be received within the forward and aft joint recesses.

6. The shroud segment assembly of claim 5, wherein the forward inner arm defines a forward radially inner surface of the forward shroud portion and the aft inner arm defines an aft radially inner surface of the aft shroud portion, the radially inner wall of the second expansion joint defining a joint inner surface of the second expansion joint, wherein the radially inner wall of the second expansion joint is received within the forward and aft joint recesses such that the joint inner surface is substantially radially aligned with the forward and aft radially inner surfaces.

7. The shroud segment assembly of claim 3, wherein the forward inner arm defines a forward radially inner surface of the forward shroud portion and the aft inner arm defines an aft radially inner surface of the aft shroud portion, wherein the radially inner wall of the second expansion joint is disposed radially inwardly from the forward and aft radially inner surfaces.

8. The shroud segment assembly of claim 3, wherein the radially inner wall of the second expansion joint defines at least a portion of a flowpath surface for the shroud segment assembly.

9. A shroud segment assembly for use within a turbine shroud of a gas turbine engine, the shroud segment assembly comprising:
a shroud body extending circumferentially between a first end and a second end and radially between a radially inner side and a radially outer side, the shroud body including an outer wall extending along the radially outer side of the shroud body and forward and aft walls extending radially inwardly from the outer wall, the shroud body further including a first arm extending from the forward wall in the direction of the aft wall along the radially inner side of the shroud body and a second arm extending from the aft wall in the direction of the forward wall along the radially inner side of the shroud body, the first arm being spaced apart axially from the second arm such that a circumferential slot is defined between the first and second arms that extends circumferentially between the first and second ends along the radially inner side of the shroud body; and
an expansion joint positioned within the circumferential slot between the first and second arms,
wherein the expansion joint includes a radially outer wall, a radially inner wall and a connecting wall extending between the radially inner and outer walls, the expansion joint defining a forward recess between the radially inner and outer walls along a forward side of the connecting wall, the expansion joint further defining an aft recess between the radially inner and outer walls along an aft side of the connecting wall, and
wherein the first arm defines a forward joint recess and the second arm defines an aft joint recess, the radially inner wall of the expansion joint extending between the first and second arms to be received within the forward and aft joint recesses.

10. The shroud segment assembly of claim 9, wherein the first arm is configured to be received within the forward recess and the second arm is configured to be received within the aft recess.

11. The shroud segment assembly of claim 9, wherein the first arm defines a forward radially inner surface and the second arm defines an aft radially inner surface, the radially inner wall defining a joint inner surface of the expansion joint, wherein the radially inner wall is received within the forward and aft joint recesses such that the joint inner surface is substantially radially aligned with the forward and aft radially inner surfaces.

12. The shroud segment assembly of claim 9, wherein the first arm defines a forward radially inner surface and the second arm defines an aft radially inner surface, wherein the radially inner wall is disposed radially inwardly from the forward and aft radially inner surfaces.

13. The shroud segment assembly of claim 9, wherein the radially inner wall defines at least a portion of a flowpath surface for the shroud segment assembly.

14. A shroud segment assembly for use within a turbine shroud of a gas turbine engine, the shroud segment assembly comprising:
a shroud body extending circumferentially between a first end and a second end and radially between a radially inner side and a radially outer side, the shroud body including an inner wall extending along the radially inner side of the shroud body and forward and aft walls extending radially outwardly from the inner wall, the shroud body further including a first arm extending from the forward wall in the direction of the aft wall along the radially outer side of the shroud body and a second arm extending from the aft wall in the direction of the forward wall along the radially outer side of the shroud body, the first arm being spaced apart axially from the second arm such that a circumferential slot is defined between the first and second arms that extends circumferentially between the first and second ends along the radially outer side of the shroud body; and
an expansion joint positioned within the circumferential slot between the first and second arms, the expansion joint including a radially outer wall, a radially inner wall and a connecting wall extending between the radially inner and outer walls, the expansion joint defining a forward recess between the radially inner and outer walls along a forward side of the connecting wall, the expansion joint further defining an aft recess between the radially inner and outer walls along an aft side of the connecting wall,
wherein the first arm is configured to be received within the forward recess and the second arm is configured to be received within the aft recess, and wherein ends of the radially outer wall of the expansion joint are configured to be supported by a hanger of the gas turbine engine.

15. The shroud segment assembly of claim 14, wherein the radially outer wall of the expansion joint is positioned radially outwardly from the first and second arms of the shroud body and wherein the radially inner wall of the expansion joint is positioned radially inwardly from the first and second arms of the shroud body.

\* \* \* \* \*